Dec. 7, 1937.   H. NUTT ET AL   2,101,410
CLUTCH PLATE
Filed Dec. 11, 1933   2 Sheets-Sheet 1
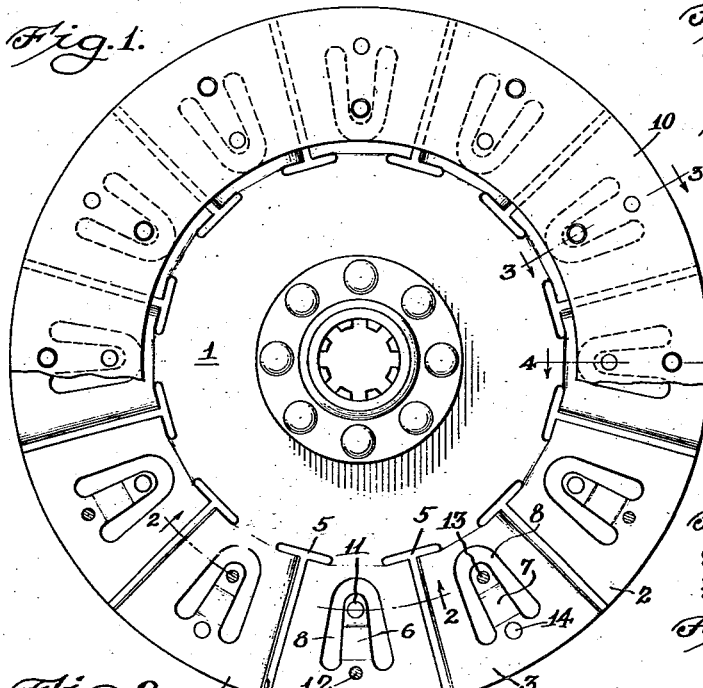
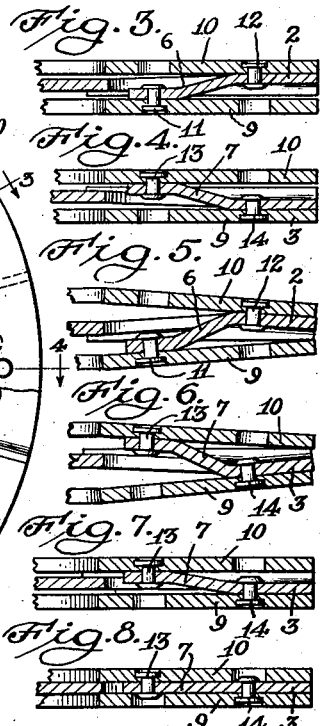
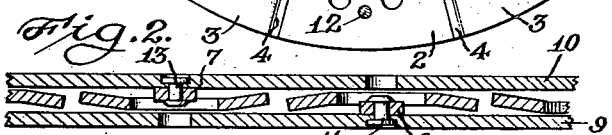
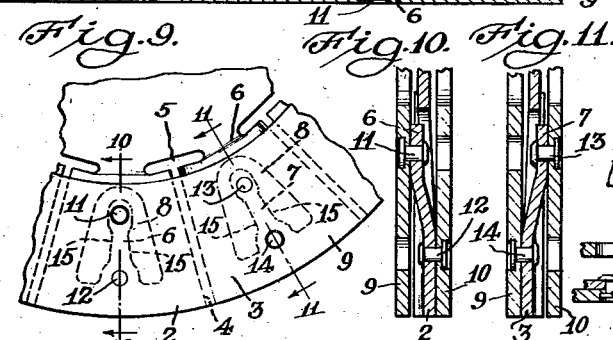
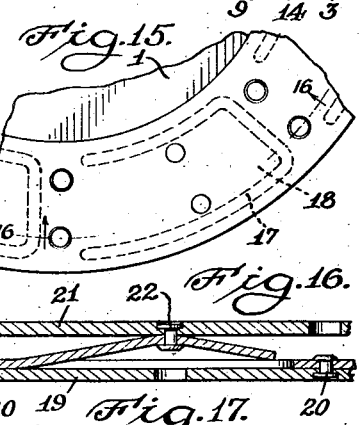
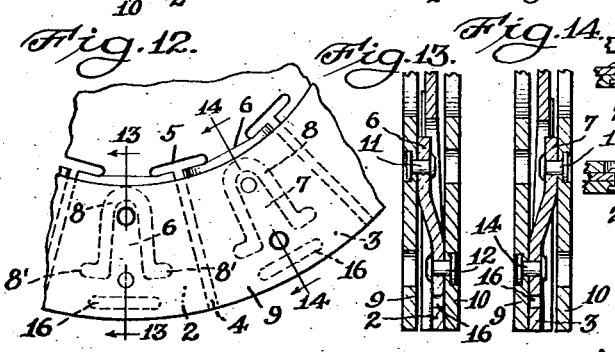
INVENTORS:
Harold Nutt and
Harold V. Reed
BY Wm. O. Belt
ATTORNEY

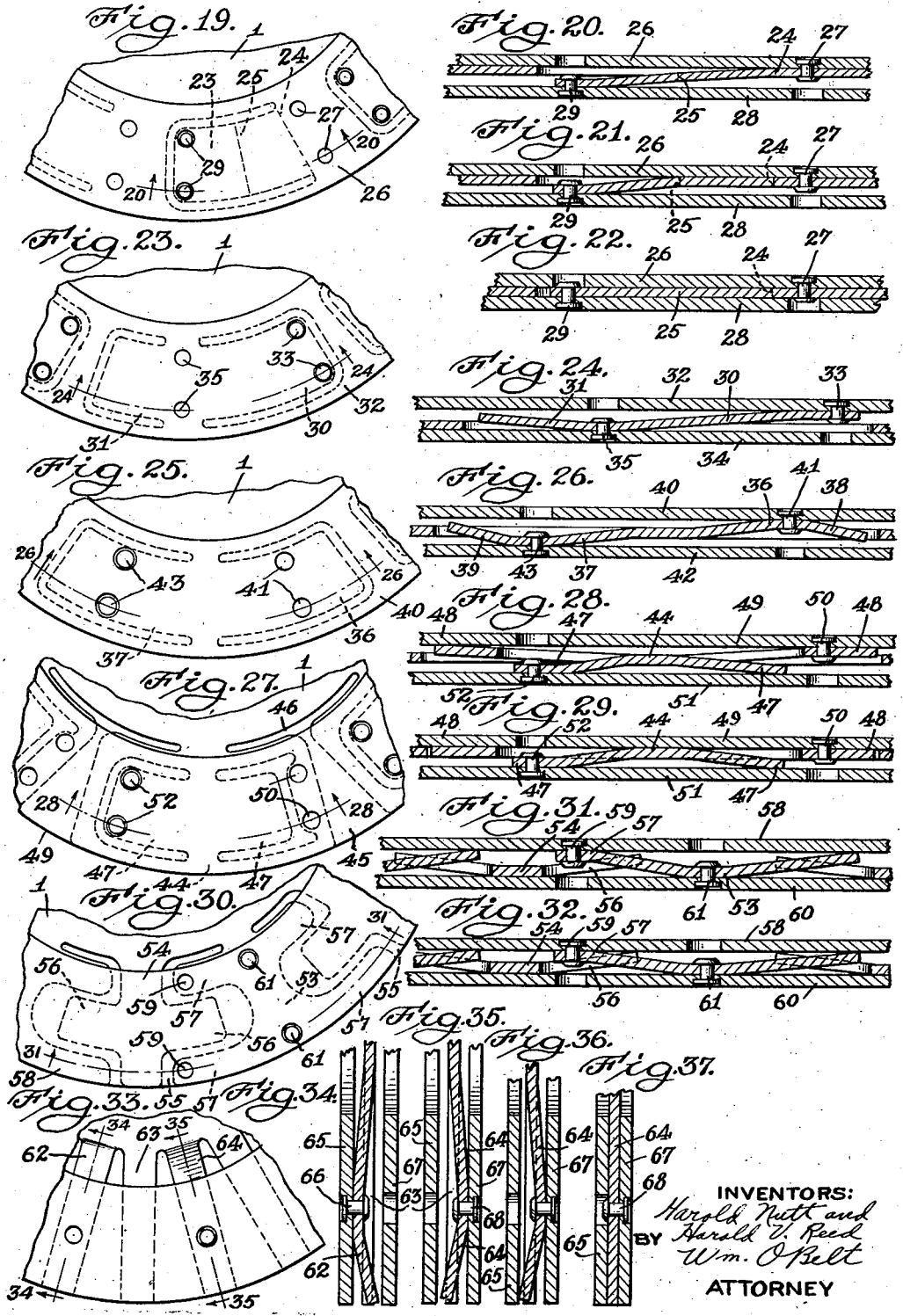

Patented Dec. 7, 1937

2,101,410

UNITED STATES PATENT OFFICE 2,101,410

CLUTCH PLATE

Harold Nutt and Harold V. Reed, Chicago, Ill., assignors, by mesne assignments, to Borg-Warner Corporation, Chicago, Ill., a corporation of Illinois Application December 11, 1933, Serial No. 701,888

17 Claims. (Cl. 192—107)

This invention relates to friction clutches for automotive vehicles and it may also be used in other friction clutches for which it is or may be adapted.

The primary objects of the invention are to provide a novel clutch which will take hold easily and smoothly without shock or jar and which will dampen the engagement chatter often produced in clutches.

Clutches have been made heretofore with a clutch plate adapted to be gripped or clamped between two parts of a driving member to impart motion from the driving member to a driven member. The clutch plate has been provided with friction facings which have been supported yieldingly by some form of cushion on the plate and this cushion has been brought into action simultaneously with initial engagement of the clutch and has operated in one stage and the resistance of the cushion has increased in direct proportion to the pressure of the engaging parts of the clutch.

This cushioning of the clutch plate has successfully eliminated the chatter which has often resulted from moderate and heavy torque engagement of the clutch but it has not satisfactorily eliminated the chatter which results under initial engagement of the clutch in present day developments and uses of clutches, particularly of the centrifugally operated type and of the vacuum operated type.

Another and important object of the invention is to divide the resistance of the cushion support for the friction facings of the clutch plate into stages of different degrees so that there will be a very light resistance or soft cushion upon initial engagement of the clutch and a stronger resistance or firm cushion under moderate and heavy torque engagement of the clutch to eliminate chatter throughout the engagement and disengagement of the clutch.

And a further object is to provide for a multistage engagement of the cushion support for the friction facings in the clutch plate whereby a very light but gradually increasing resistance is provided upon initial engagement of the clutch and a stronger and cumulative resistance is provided under moderate and heavy torque engagement of the clutch to eliminate chatter throughout the engagement and disengagement of the clutch.

In the accompanying drawings we have illustrated several embodiments of the invention and referring thereto Fig. 1 is a plan view of a clutch plate embodying our invention showing one of the friction facings partly broken away;

Fig. 2 is a section on the line 2—2 of Fig. 1;

Fig. 3 is a section on the line 3—3 of Fig. 1 showing the invention used with friction facings substantially parallel with the clutch plate;

Fig. 4 is a section on the line 4—4 of Fig. 1;

Figs. 5 and 6 are sectional views of a modified form of the invention and similar to Figs. 3 and 4, respectively, but showing the friction facings at an angle to the clutch plate;

Fig. 7 is a sectional view of the form shown in Figs. 3 and 4 or in Figs. 5 and 6 showing the friction facings under initial compression;

Fig. 8 is a sectional view showing the same friction facings totally compressed;

Fig. 9 is a fragmentary plan view of a modified form of the invention;

Figs. 10 and 11 are sectional views taken on the lines 10—10 and 11—11 respectively of Fig. 9;

Fig. 12 is a fragmentary plan view of another modified form of the invention;

Figs. 13 and 14 are sectional views taken on the lines 13—13 and 14—14 respectively of Fig. 12;

Fig. 15 is a fragmentary plan view of another form of the invention;

Figs. 16, 17 and 18 are sectional views taken on the line 16—16 of Fig. 15 and showing the friction facings normal, under initial compression, and under total compression, respectively;

Fig. 19 is a fragmentary plan view of another form of the invention;

Figs. 20, 21 and 22 are sections taken on the line 20—20 of Fig. 19 showing the friction facings normal, under initial compression, and under total compression, respectively;

Fig. 23 is a fragmentary plan view of another form of the invention;

Fig. 24 is a sectional view taken on the line 24—24 of Fig. 23 and showing the friction facings in normal position;

Fig. 25 is a fragmentary view of another form of the invention;

Fig. 26 is a sectional view taken on the line 26—26 of Fig. 25 and showing the friction facings in normal position;

Fig. 27 is a fragmentary plan view of another form of the invention;

Figs. 28 and 29 are sectional views taken on the line 28—28 of Fig. 27 and showing the friction facings normal, and under initial compression, respectively;

Fig. 30 is a fragmentary plan view of another form of the invention;

Figs. 31 and 32 are sectional views taken on the line 31—31 of Fig. 30 and showing the friction facings normal, and under initial compression, respectively;

Fig. 33 is a fragmentary plan view of still another form of the invention;

Fig. 34 is a sectional view taken on the line 34—34 of Fig. 33; and

Figs. 35, 36 and 37 are sectional views taken on the line 35—35 of Fig. 33 and showing the friction facings normal, under initial compression, and under total compression, respectively.

Referring to the drawings, the clutch plate 1 of Figs. 1-14 is divided into a plurality of sectors 2 and 3 by radial slots 4 which extend through the periphery of the plate. The radial slots connect at their inner ends with transverse slots 5 to form T-shaped slots separating and defining the sectors. Each of the sectors 2 and 3 is bent transversely into the shape of a section of a frustum of a conical shell; the sectors 2 are bent to offset the side edges thereof on one side of the plate, and the sectors 3 are bent to offset the side edges thereof on the other side of the plate. The sectors 2 have radially disposed and inwardly directed tongues 6 and the sectors 3 also have radially disposed and inwardly directed tongues 7. These tongues are formed by cutting slots 8 which may be generally described as U-shaped in the sectors. The sectors 2 are bodily bent at their juncture with the body of the plate between the transverse slots 5 on one side of the plate and the sectors 3 are similarly bent on the opposite side of the plate. The side edges of the sectors are bent more at their outer ends than at their inner ends and the side edges of each group of sectors lie in the same plane and each of said planes will be parallel to each other and parallel to the body of the plate. The tongues 6 of the sectors 2 are bent to offset the free ends thereof beyond the side edges of the sectors 2 and likewise the tongues 7 of the sectors 3 are bent to dispose the free ends thereof beyond the side edges of the sectors 3. A friction facing 9 is fastened on one side of the plate by rivets 11 to the free ends of the tongues 6 and by rivets 14 to the base of the tongues 7, and a friction facing 10 is fastened on the opposite side of the plate by rivets 13 to the free ends of the tongues 7 and by rivets 12 to the base of the tongues 6. Inasmuch as the free ends of the tongues 6, 7 are bent beyond the side edges of their respective sectors the facings will normally be held beyond the side edges of the sectors where they engage the free ends of the tongues. Thus when clutching pressure is applied to the facings the initial stage of resistance is afforded solely by the tongues until the facings come in contact with the side edges of the sectors, Fig. 7. The next stage of resistance of the cushions is afforded by the tongues and sectors combined until they have all become completely flattened into the plane of the body of the plate wherein non-yielding resistance is afforded, Fig. 8.

The tongues may be bent to such an extent that the facings mounted thereon will be substantially parallel but if conditions of use require it and it is desired the tongues may be bent still further so that the facings will normally lie at an angle to the plane of the plate, Figs. 5 and 6. By providing the facings at an angle to the plate the initial resistance of the tongues will extend through a greater degree of movement and after the initial resistance is overcome the action of the plate will be identical with that of a plate wherein the facings are normally substantially parallel, Figs. 7 and 8.

Under some conditions of use it may be desirable to weaken the resistance normally afforded by a substantially straight-edge tongue as shown in Fig. 1. This may be accomplished by cutting away the side edges of the tongues at 15, Fig. 9, thereby reducing the width of the tongues midway between the ends thereof. A similar result may be attained by providing a transverse slot 16, Fig. 12, in the sectors at the base of the tongues to reduce the strength thereof and lessen the resistance of the tongues; or the ends of the U-shaped slots 8 may be extended laterally at 8', Fig. 12.

Figs. 15-18 show substantially U-shaped slots 17 cut in the peripheral portion of the plate 1 and forming tongues 18 extending circumferentially of the plate in one direction. If desired, however, adjacent tongues may extend circumferentially in opposite directions as shown in Fig. 25. The tongues 18 are bent transversely at their base from the body of the plate to one side thereof. The free end portions of the tongues 18 are bent back toward the plate but the ends of the tongues do not extend into the plane of the body of the plate. A friction facing 19 is fastened to one side of the plate by rivets 20 located at the base of the tongues. Another facing 21 is fastened to the opposite side of the plate by rivets 22 located at the bend of the end portion of the tongues. It will thus be seen that one facing may be flush with one side of the body of the plate while the opposite facing is raised above the plate to the extent of the bend of the tongue at the base thereof. However, adjacent tongues may be bent to opposite sides of the plate similar to the form shown in Figs. 25 and 26 in which event the facings would only be fastened to the tongues and neither of the facings would be fastened at any place to the body of the plate and the facings would both be raised from the plane of the plate to the extent caused by the bends of the tongues at the base thereof. The initial stage of resistance consists in straightening the bends at the base of the tongues until the free ends of the tongues come in contact with the opposite facing, Fig. 17. The next stage of resistance consists in further straightening of the bend of the tongues at the base thereof combined with the straightening of the bend of the end portion of the tongues until both bends of each tongue have been eliminated and the tongues have come wholly within the plane of the body of the plate, Fig. 18.

Figs. 19-22 show circumferentially directed tongues 23 having a double bend therein, one of which occurs at the base of the tongue as shown at 24 and offsets the tongue from the plane of the plate. Substantially midway between the base and the free end of the tongue is another bend in the same direction as shown at 25 tending to raise further the free end of the tongue from the plane of the plate. A friction facing 26 is fastened flush with the plate on one side of the plate by rivets 27 at the base of the tongues. Another facing 28 is fastened to the free ends of the tongues on the other side of the plate by rivets 29. The first stage of resistance consists in straightening the bend at 24, Fig. 21. The bend at 24 will be straightened before the bend at 25 because of the much longer lever arm between the bend at 24 and the free end of the tongue. The next stage of resistance consists in straightening the bend at 25 so that the tongue will lie completely in the plane of the body of the plate, Fig. 22.

Figs. 23 and 24 show circumferentially directed tongues arranged in pairs, one tongue 30 of each pair extending in one direction and the other tongue 31 of each pair extending in the opposite direction. The tongues are bent at their base from the body of the plate to one side thereof and at the same angles thereto. The tongues 30 are of greater length than the tongues 31, consequently the free ends of the tongues 30 will extend further from the plate than the ends of the tongues 31. A friction facing 32 is fastened by rivets 33 on one side of the plate to the ends of the long tongues 30 and a friction facing 34 is fastened on the other side of the plate and flush therewith by rivets 35 at the base of the tongues of each pair. The initial stage of resistance will consist solely in straightening the long tongues 30 until the facing 32 contacts the ends of the short tongues 31 and the next stage of resistance will consist in further straightening the long tongues 30 and in straightening the tongues 31 until they lie wholly within the plane of the body of the plate.

Figs. 25 and 26 show circumferentially directed tongues arranged in pairs, one tongue 36 of each pair extending in one direction and the other tongue 37 of each pair extending in the opposite direction. The tongues 36 are bodily bent at their base from one side of the body of the plate and the tongues 37 are bodily bent at their base from the other side of the plate. The end portions 38 of the tongues 36 are bent back toward the body of the plate and to such an extent that their ends extend beyond the body of the plate. The end portions 39 of the tongues 37 are bent back toward the body of the plate and to such an extent that their end portions extend beyond the body of the plate. A friction facing 40 is fastened on one side of the plate by rivets 41 to the tongues 36 at the base of the end portions thereof. Another friction facing 42 is fastened on the other side of the plate by rivets 43 to the tongues 37 at the base of the end portions thereof. The initial stage of resistance consists in straightening the bend at the base of the tongues until the ends of the tongues on each side of the plate contact the facing on the opposite side of the plate and the next stage of resistance consists in further straightening the bend at the base of the tongues and in straightening the bend at the base of the end portions of the tongues until the tongues lie wholly within the plane of the body of the plate.

Figs. 27-29 show sectors 44 formed in the periphery of the plate by radial slots 45 terminating in transverse slots 46. The sectors have formed therein a pair of circumferentially directed tongues 47, one tongue of each pair extending in one direction and the other tongue extending in the opposite direction. The side edges 48 of the sectors are bent from the body of the plate to one side thereof and the tongues are bent from the body of the plate to the opposite side thereof. A friction facing 49 is fastened on one side of the plate by rivets 50 to at least one side edge portion of each of the sectors and another friction facing 51 is fastened by rivets 52 on the opposite side of the plate to the end portion of at least one of each pair of tongues 47. The first stage of resistance consists in straightening the sectors 44 so that they will lie wholly within the plane of the body of the plate, Fig. 29. The sectors will straighten prior to the straightening of the tongues because of the greater length of the lever arm of the sectors. The next stage of resistance consists in the straightening of the tongues so that they will lie wholly within the plane of the plate.

Figs. 30-32 show sectors 53 and 54 arranged in pairs formed by slots 55 extending inwardly from the periphery of the plate, the sectors 54 of each pair having tongues 56 extending laterally from the central portion of the side edges thereof and the sectors 53 having tongues 57 extending laterally from the end portions of the side edges of the sectors. The tongues 57 being longer than the tongues 56 and extending from the sectors at substantially the same angle will have their free ends at a greater distance from the plane of the body of the plate. A friction facing 58 on one side of the plate is fastened by rivets 59 to the end portions of the tongues 57 on at least one side of the sectors 53. Another friction facing 60 on the opposite side of the plate is fastened by rivets 61 to the body of the sectors 53. The first stage of resistance consists in straightening the tongues 57 of the sectors 53 until the facing 58 comes in contact with the ends of the tongues 56 on the sectors 54, Fig. 32. The next stage of resistance consists in the further straightening of the tongues 57 and the straightening of the tongues 56 until all of the tongues lie wholly within the plane of the body of the plate.

Figs. 33-37 show radial tongues 62, 63 and 64. All of the tongues extend radially at the periphery of the plate and the tongues 62 are bent at their base where they join the body of the plate and from one side of the plate. The tongues 63 lie wholly within the plane of the body of the plate and the tongues 64 are bent bodily at their base where they join the body of the plate from the side of the plate opposite that from which the tongues 62 are bent. The tongues 62 and 64 have their end portions bent back toward the plane of the body of the plate with their ends located beyond the plane of the body of the plate. A friction facing 65 is fastened by rivets 66 to the tongues 62 at the base of the end portion thereof on one side of the plate and a friction facing 67 is fastened by rivets 68 to the tongues 64 at the base of the end portion thereof and on the other side of the plate. The first stage of resistance consists in straightening the tongues 62 and 64 until the ends of the tongues come in contact with the facing on the opposite side of the plate, Fig. 36. The next stage of resistance consists in the further straightening of the bends at the base of the tongues 62 and 64 and with the straightening of the end portions of the tongues until they lie wholly within the plane of the body of the plate, Fig. 37.

The invention is capable of embodiment in a variety of forms to bring the cushion for the facings into action in stages to vary the resistance afforded thereby. The forms of Figs. 1-14 and 27-29 show stages provided by a combination of tongues and sectors. The forms of Figs. 15-22 show stages provided by tongues only. The forms of Figs. 23-26 and 30-37 show stages provided by a combination of variedly formed tongues. Forms for providing a different number of stages will be suggested by those illustrated and described.

The multi-stage cushion of this invention supports the facings to yield under a gradually increasing but comparatively light resistance or soft cushion during initial engagement in one stage and then passes to another stage of gradually increasing but stronger resistance or firm cushion and absorbs the clutch operating vibrations which have heretofore produced chatter during engagement and disengagement of the clutch.

The invention may be adapted for clutches of many different forms for many different purposes and we do not limit it to the forms herein shown and described but reserve the right to use it in any form and for any purpose for which it is or may be adapted within the scope of the following claims.

We claim:

1. A clutch plate having a friction facing on the side thereof, sectors in the peripheral portion of said plate having portions extending away from the plane of the body of the plate in the direction of said facing, tongues in said sectors, and bends in said tongues and in said sectors cooperating to provide a multi-stage cushion on said plate for said facing, said sector portions and said tongues being arranged relative to said facing in a manner such that the facing is supported by the tongues out of engagement with the sectors during the initial stage of cushion action, but contacts the said sector portions during a succeeding stage of cushion action.

2. A clutch plate having a friction facing on the side thereof, sectors in the peripheral portion of said plate bent transversely to displace the side edges of said sectors out of the plane of the plate, and tongues in said sectors bodily bent to displace the free ends of said tongues beyond the side edges of said sectors and cooperating with said sectors to provide a multi-stage cushion for said plate.

3. A clutch plate having friction facings on the sides thereof, sectors in the peripheral portion of said plate alternately bent transversely to displace the side edges of said sectors out of the plane of the plate and on opposite sides thereof, and tongues in said sectors bodily bent to displace the free ends of said tongues beyond the side edges of said sectors, each of said facings being fastened to the free ends of alternate tongues.

4. A clutch plate having friction facings on the sides thereof, sectors in the peripheral portion of said plate, said sectors bent transversely to displace the side edges thereof from one side of said plate, and tongues in said sectors bent at their base from the same side of the plate.

5. A clutch plate having friction facings on the sides thereof parallel to one another and each in spaced apart and parallel relationship to the plane of the body of said plate, sectors in the peripheral portion of said plate having yieldable portions and means on the sectors and located between the facings and providing with said yieldable portions a multi-stage cushion for the facings, said facings being out of engagement with said sectors during the first stage of cushion action and engageable with the yieldable portions of said sectors during a succeeding stage of cushion action.

6. A clutch plate having friction facings on the sides thereof parallel to one another and each in spaced apart and parallel relationship to the plane of the body of said plate, sectors in the peripheral portion of said plate bent to displace the side edges thereof out of the plane of the plate, and means in said sectors bent to cooperate with said sectors to provide a multi-stage cushion for the facings said facings being out of engagement with said sectors during the first stage of cushion action and engageable with said sectors during a succeeding stage of cushion action.

7. A clutch plate having friction facings on the sides thereof, tongues in the peripheral portion of said plate bent to form a cushion for said facings, and means cooperating with said tongues to provide a multi-stage cushion for the facings, said facings being so arranged relative to said tongues and said means as to lie out of engagement with said means during the initial stage of cushion action and upon the yielding of said tongues to engage with said means during a succeeding stage of cushion action.

8. A clutch plate assembly comprising, a hub member, a circular metal plate mounted on said hub member, and a friction facing located on one side of said plate in spaced apart and parallel relationship therewith, said plate having that portion thereof, in register with said facing, formed to provide a yieldable support for the facing relative to the plane of the body of the plate presenting a resistance to bodily movement of the facing toward the plate in at least two separate and consecutive stages each in a different amount, at least one of said stages of resistance being provided by tongues integral with and offset at one side of the plate and secured at their free end portions to said facing, said facing being free of engagement with all portions of said plate other than said tongues during the said one stage of resistance and engageable with portions of said plate during a succeeding stage of resistance.

9. A clutch plate assembly comprising, a hub member, a circular metal plate mounted on said hub member, and a friction facing on one side of said plate in spaced apart parallel relationship to the plane of the plate, said plate being formed to provide a multi-stage cushion between the body of the plate and said facing operable in at least two separate stages of resistance to bodily movement of the facing toward the plate, the first stage being comparatively soft and the second stage being comparatively firm, a part of that portion of said plate forming said multi-stage cushion including tongues offset from the plane of the plate and secured at their free end portions to said facing, said facing being free of engagement with all portions of said plate other than said tongues during the said one stage of resistance and engageable with portions of said plate during a succeeding stage of resistance.

10. A clutch plate assembly comprising, a hub member, a circular metal plate mounted on said hub member, and a friction facing on one side of said plate in spaced apart parallel relationship to the plane of the plate, said plate being formed to provide a multi-stage cushion between the body of the plate and said facing operable in at least two separate stages of resistance to bodily movement of the facing toward the plate, the first stage being comparatively soft and the second stage being comparatively firm, a part of that portion of said plate forming said multi-stage cushion including tongues offset from the plane of the plate and secured at their free end portions to said facing, said cushion gradually increasing in resistance during each separate stage of operation said facing being free of engagement with all portions of said plate other than said tongues during the said one stage of resistance and engageable with portions of said plate during a succeeding stage of resistance.

11. In a friction clutch disc, a driven plate adapted to be mounted upon a shaft, an annular friction facing carried by said plate on one side thereof, a similar friction facing disposed upon the opposite side of the plate in normally spaced apart relationship relative thereto, and multistage cushion means carried by said plate yieldingly to support said last named facing thereupon, said means comprising a plurality of resilient members each fixed adjacent one end relative to the plate, and each free at its outer end, and each having an intermediate bowed portion contacting with and secured to said last named facing, said free ends of said cushion members being adapted, during compression of the disc, to engage with and abut a portion of said plate and first named facing assembly.

12. A friction clutch disc, as defined in claim 11, wherein the resilient members are arranged with their longitudinal axes extending circumferentially of the plate and wherein the bowed portion of each resilient member is bowed in a substantially arcuate curve.

13. A friction clutch disc, as defined in claim 11, wherein the cushion members extend in annular array about the outer region of the plate.

14. A friction clutch disc comprising, a driven plate adapted to be mounted on a shaft, a pair of annular friction facings, one for each side of said plate, and means carried by said plate providing resilient cushion members extending generally in a circumferential direction relative to said plate and having intermediate portions normally spaced away from said plate, one of said facings being secured to said intermediate cushion portions, thereby to provide a resilient support for the facing relative to said plate, said plate having openings therethrough, said cushions having other portions at the outer ends thereof beyond said intermediate portions extending through the openings in said plate and adapted to engage the other facing.

15. A friction clutch disc comprising, a driven plate adapted to be mounted upon a shaft, a pair of annular friction facings, one for each side of said plate, means securing one of said facings to said plate, and means carried by said plate providing a plurality of resilient cushion members yieldingly to support the other facing upon said plate in spaced apart and substantially parallel relationship thereto, said cushions extending in a circumferential direction relative to said plate and having portions bowed away from said plate and other portions at the free ends thereof extending in the direction of the plate, said plate having openings therethrough whereby the said end portions of said cushions may contact with said first named facing and may slide thereupon during compression of the cushion.

16. In a friction clutch disc, a driven plate adapted to be mounted upon a shaft, a pair of friction facings, one disposed upon each side of said plate, and resilient cushion members interposed between said plate and at least one of said facings, said cushion members acting substantially in the manner of a cantilever spring circumferentially of the disc during the first stage of disc compression and as a half-elliptic spring during the second stage of disc compression.

17. In a friction clutch disc, a driven plate adapted to be mounted upon a shaft, a pair of friction facings, one disposed upon each side of said plate, and resilient cushion members interposed between said plate and at least one of said facings, said cushion members being arranged with their longitudinal axes extending in circumferential array about the outer portion of said plate and each acting substantially in the manner of a cantilever spring during the first stage of disc compression and as a half-elliptic spring during the second stage of disc compression.

HAROLD NUTT.
HAROLD V. REED.